A. M. SAWYER.
Process of Treating Spiritous Liquors.
No. 232,071.    Patented Sept. 7, 1880.
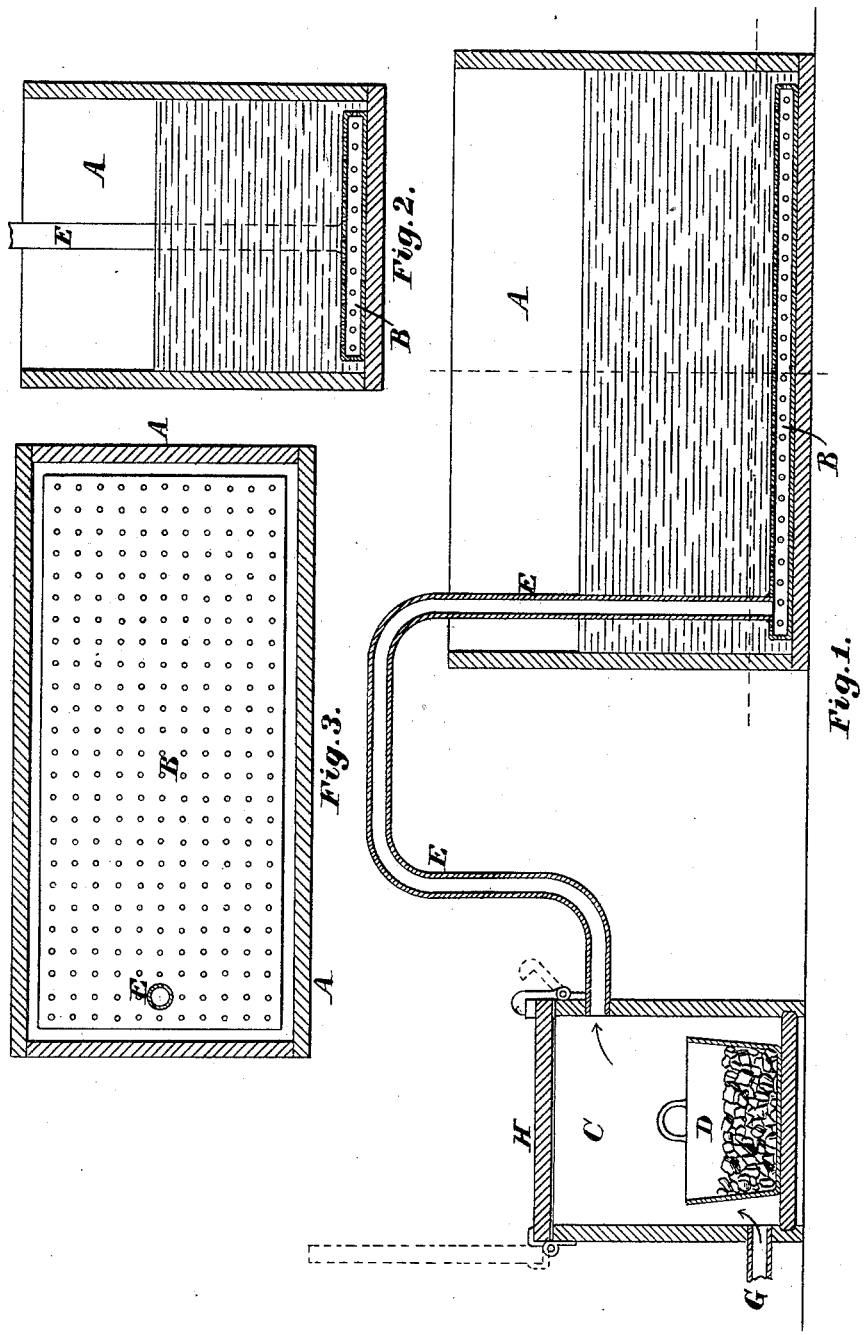
Witnesses:
E. A. Hemmenway
C. H. Dodd
Addison M. Sawyer    Inventor:
By Wm C Hibberd Atty

United States Patent Office.

ADDISON M. SAWYER, OF ATHOL, MASSACHUSETTS.

PROCESS OF TREATING SPIRITUOUS LIQUORS.

SPECIFICATION forming part of Letters Patent No. 232,071, dated September 7, 1880.

Application filed September 27, 1879.

*To all whom it may concern:*

Be it known that I, ADDISON M. SAWYER, of Athol, in Worcester county, in the State of Massachusetts, have invented a Process of Treating Spirituous Liquors, of which the following is a specification.

The purpose of this invention is to produce in spirituous liquors the effect which is commonly known as "aging," which result can be effected in a comparatively short time by the process herein described, which will also impart an improved flavor to the same to suit the taste of the user.

In the accompanying drawings is shown one form of apparatus by which said process may be carried into effect.

In the drawings, Figure 1 is a sectional elevation of the same. Fig. 2 is a transverse section, and Fig. 3 a view in plan, of the tank, near the bottom, in which the liquor is treated.

A is a tank made of wood and lined with tin, copper, lead, or otherwise made suitable to contain the liquor to be treated.

B is a perforated case or chamber, which receives, by the pipe E, a blast of air from any suitable blowing apparatus which will generate a blast of sufficient pressure to overcome the hydrostatic pressure of the liquid within the tank A.

C is a closed chamber, within which is placed a pan, D, which is partly filled with quicklime. This chamber is closed with a cover, H, which closes the chamber as nearly air-tight as may be. This chamber communicates with the chamber B by a pipe, E, through which the air is forced into the chamber B, and through the small holes in the chamber B into the liquor in the tank A, and bubbles up through the liquor and escapes into the surrounding air.

The cover H of the chamber C is provided with suitable hinges and fastenings, as shown, to compel the air to flow into the chamber B and through the liquor.

G is a pipe connecting with the chamber C, and with the blowing-machine by which the air is supplied.

By opening the cover H quicklime can be readily placed in the pan D to supply the fumes of quicklime used in the process, as will be described.

The tank A may be made of wood and lined with tin, lead, copper, or some other metal, if preferred, that will not injuriously affect the liquor contained in it. The action of the air thus charged with the fumes of quicklime has the effect to neutralize all deleterious substances present in the liquor, such, for example, as fusel-oil, which is usually left to escape or evaporate by time or "aging," as it is usually called, which removes the raw or acrid flavor that the liquor receives in distilling it.

After the liquor has been subjected to this treatment for several minutes it will be found to be nearly exempt from the raw taste which the liquor possesses when newly made, and this process enables the useful effect produced by age to be produced by this apparatus in a few minutes.

The operation is as follows: The new liquor is placed in the tank A in as great quantity as is desired to be treated at once. The pan D is then filled, say nearly half-full of fresh quicklime. The pan is then filled an inch (more or less) deep with boiling-hot water, by which the lime immediately commences to slake and to give off fumes, by which fumes the air supplied by the blowing-machine is charged by passing through the chamber C, and by the pipe E into the chamber B, from which it escapes into the liquor through the perforations, which are made, as shown, in the walls of the chamber B, and from thence through the liquor to the open air.

It is obvious from this that the air must be supplied with a sufficient pressure to overcome the hydrostatic pressure of the depth of fluid in the tank A when filled to its greatest depth as used, and the time of operation will generally occupy say, from five to ten minutes, varying somewhat with the character of the liquor and the amount of action desired to be produced upon it.

What I claim as my invention is—

The process herein described of treating spiritous liquors to produce the effect commonly known as "aging," by forcing through a body of the liquor common air charged with the fumes of quicklime, substantially as described.

Executed September 6, 1879.

ADDISON M. SAWYER.

In presence of—
THOMAS H. GOODSPEED,
FOSTER J. BENJAMIN.